3,021,290
CELLULAR POLYURETHANE CONTAINING WOOD CELLULOSE AND METHOD OF PREPARING SAME

George T. Gmitter, Akron, Edwin M. Maxey, Stow, and Merle J. Sanger, Akron, Ohio, assignors to The General Tire & Rubber Company, Akron, Ohio, a corporation of Ohio
No Drawing. Filed Oct. 27, 1958, Ser. No. 769,576
4 Claims. (Cl. 260—2.5)

The present invention relates to cellular polyurethane materials and to the method of preparing the same.

Polyurethane foamed materials have a great potential commercial use in cushioning articles and the like. The present invention is directed to a method for improving the load deflection curve, and the resiliency of polyurethane foams, particularly polyalkylene ether glycol/polyisocyanate foams of relatively low density, such as those in the range of say about 1 to 6 lbs. per cubic foot.

Polyalkylene ether glycol-polyisocyanate foams are generally preferred over polyester-polyisocyanate foams for cushioning application because of their superior resilience and humidity aging properties. For some cushioning uses such as when the polyurethane foams are used over plywood or other unyielding base, it is necessary that the foams have a high load carrying capacity at high deflection to reduce any tendency to "bottom out."

One of the drawbacks to the use of the polyurethane foams and particularly polyalkylene ether glycol-urethane foams is the fact that they tend to have a low modulus and a relatively low load carrying capacity at high deflection. At the same time, a low load capacity at low deflection is also important since it is highly desirable that a cushion offer little resistance when a person first sits on it. After the person is seated, the cushion should offer substantial resistance when the cushion is relatively highly deflected.

It has been proposed as seen in U.S. Patent No. 2,787,601 to add fillers such as magnesium carbonate or wood cellulose to polyester-urethane foams. As indicated in the above patent, the resultant foams were denser, more rigid and more brittle. Such properties rendered them unsuitable for use as cushioning material since, although they increased the load carrying capacity at high deflection, the fillers also greatly increased the load carrying value at low deflection.

We have found that improved polyalkylene ether glycol foams for cushioning materials can be made which have both a soft initial feeling and a high load carrying capacity at a relatively high deflection such as normally encountered in automotive and furniture applications by incorporating finely divided particles of fibrous or flaky materials such as wood cellulose and talc with the polyurethane forming ingredients before the foaming thereof. The resultant foamed polyether urethane materials have less deflection per unit of load and therefore have more load carrying capacity than ordinary polyether urethane foams.

One of the objects of the present invention is to provide an improved low density polyalkylene ether glycol/polyisocyanate foam having a relatively low load carrying capacity at relatively low deflection and a relatively high load carrying capacity at high deflection.

Other objects in the present invention are to provide improved cellular polyether urethane materials having good resilience, and load distortion curves closely resembling those of natural rubber latex foams, and a method of making the improved materials.

It is an object to provide a relatively low density foamed polyalkylene ether glycol-polyisocyanate material having a good balance of desirable properties, such as resistance to humidity aging, as well as load carrying capacity, strength and resiliency.

The polyurethane forming reactants are (1) a polyalkylene ether glycol generally having a molecular weight of at least 750 and having hydroxyl end groups and (2) a polyisocyanate having 2 to 3 functional isocyanate groups. The cellular polyurethanes are formed by reacting the above described polyether and polyisocyanate and expanding the resultant reaction product with a blowing agent which generally is carbon dioxide formed from the reaction between excess diisocyanate and water, or a gas formed by the volatilization of a readily liquefied gas such as an alkane substituted halogen gas or a gas formed by the decomposition of a compound such as ammonium carbonate. Generally, in the past, polyoldiisocyanate foams have been made by reacting a nonlinear slightly branched polyalkylene ether glycol with a diisocyanate and a small amount of water or by reacting a linear polyether with a mixture of di- and tri-isocyanates and water. An excess of diisocyanate over that needed to react with the polyether to form the polyurethane was used to react with the water and produce carbon dioxide for forming the cells in the solid product.

A preferred method of making a foamed polyurethane is by reacting first a polyalkylene ether glycol and a diisocyanate so as to form a flowable or viscous dry partially reacted prepolymer, and subsequently adding an activator mixture which generally comprises water and a suitable reaction catalyst to the previously mentioned dry prepolymer to form the desired spongy polyurethane. In addition, a crosslinking agent containing a plurality of labile hydrogens may also be included in the activator mixture. This prepolymer process is the subject matter of application Serial No. 626,313 of George T. Gmitter, filed December 5, 1956, now abandoned.

The particles of wood cellulose or talc are finely divided fibrous or flaky materials in which each particle has a length several times its thickness and preferably 3 to 6 times its thickness. The small fiber or flake materials such as talc or wood cellulose, in accordance with the present invention, may be added by dispersing the particles in the polyether-polyisocyanate prepolymer or, preferably, may be added to the prepolymer forming ingredients as the prepolymer is being made. Thereafter, the prepolymer is reacted with the activator mixture. In addition, particularly when polyalkylene ether glycol foams are being prepared, the activator mixture should preferably contain a small amount, say .1–2% by weight based on the polyalkylene ether glycol, of a silicone oil, such as a liquid dimethyl siloxane polymer. The silicone oil is added to stabilize the foam and insure good foam structure which is generally required when using a polyalkylene ether glycol as the starting polyol material to make commercially acceptable foamed material.

The amount of wood cellulose and/or talc which may be used in the polyether urethane foams is generally about 5 to 50 parts by weight of the polyether plus polyisocyanate.

While the effectiveness of the foam material in a cushioning application may depend on many factors such as load-deflection curves, springing, and type of upholstery used, generally at least 2 and preferably 5 parts by weight of wood cellulose or talc are required to substantially increase the load carrying capacity of the foam at high or moderately-high deflection, say from 50% to 90% deflection. The best balance of physical properties including low load carrying capacity at low deflection, high load carrying capacity at high deflection, resiliency, humidity aging, tensile strength and tear strength properties are obtained when 10 to 25 parts by weight of wood cellulose or talc are incorporated into the polyether urethane foam. Generally, more than 55 to 60 parts of the load-deflection curve improvers increase the density, modulus, and load carrying capacity at low deflection, say in the 5 to 25 percent deflection range, so that the properties of the foam are no longer suitable for use in commercial cushioning application which require a soft initial feel. In addition the tensile and tear strengths of highly loaded polyether urethane sponge materials are greatly lowered.

It is important that the particle size of the wood cellulose, talc, and other mineral fillers be relatively fine, having an average particle size of generally 1 to 100 microns or even finer to obtain benefits of the present invention. For best results the fibers or flakes are so small that they can be seen in the foamed material only with the aid of a microscope. As previously described, each particle also should have a length several times its thickness which ratio is generally about 2 to 8 times its thickness or diameter. It is preferred that the average particle size of wood cellulose be about 35 to 90 microns while the preferred particle size range of talc is about 3 to 45 microns.

When using wood cellulose having an average particle size of 100 down to 1 micron, it is preferred that at least about 60 percent of the material pass through a 100 mesh screen (U.S. sieve series) and at least 40 percent pass through a 200 mesh screen. Wood cellulose, in the form of a white free-flowing powder, also oftentimes unexpectedly provides polyether urethane foams with improved humidity aging resistance both at normal and elevated temperatures. Another surprising improvement obtained by the use of wood cellulose was the improvement of flex resistance of the resultant foams over untreated polyether-polyisocyanate foams. The flex resistance of the improved polyether-urethane foams is at least as good as the best slab foams made of natural rubber latex as observed in standard flexing tests at 80% deflection.

The addition of fine talc particles to the prepolymer forming materials or the prepolymer itself, as before indicated, greatly increases the stiffness of the resultant polyurethane foam at high deflection but does not appreciably increase the stiffness at low deflection. The other physical properties of the resultant improved foam are changed very little including the feel of the foam to the sense of touch which is important in some applications.

Suitable talc particles are relatively small in size and preferably at least as fine as 3 to 45 microns as previously discussed in the case of the wood cellulose particles. Talc ($3MgO \cdot SiO_2 \cdot H_2O$), a hydrous magnesium silicate, is a mineral of crystal system No. 4 and has a specific gravity of about 2.5 to 2.8.

While not as effective as talc, other fine mineral particles may be used to obtain some stiffening of the resultant foams at high deflection without a corresponding increase of load carrying capacity at low deflection, although the increase of load capacity at low deflection is usually considerably more than in the case of talc, say roughly 2 to 3% more on the 25% compression deflection set test. In addition the use of other mineral additives increases the density of the foams to a much greater degree than talc—sometimes as much as 1 to 2 lbs./ft.$^3$ over the density of talc made foams when about 25–30 parts are used.

Minerals suitable for use in the present invention are inorganic materials found ready made in nature, and not a product of the life or decay of an organism. The mineral materials generally have a definite and characteristic crystalline structure. While finely divided talc is the best mineral load-deflection curve improving material, other very finely divided minerals may be used in place of whole or part of the talc such as mica, hydrated calcium silicate and even calcium carbonate providing it is of extremely fine particle size so that substantially all of the particles are less than 15 microns in diameter and providing at least some talc or flaky mineral having a length several times its thickness is used, say at least 5 parts. Muscovite or common mica ($3Al_2 \cdot K_2O \cdot 6SiO_2 \cdot 2H_2O$) of crystal system No. 5 and a specific gravity of about 2.7 to 3.0 is the preferred mica of the group of a number of lustrous, laminated, hard silicate minerals of micaceous character which are characterized by their cleavage in one direction. Generally, the mica materials are hydrous silicates of aluminum with varying composition, some of them being associated with potassium, lithium, magnesium and iron.

The calcium silicate, in addition to having a particle size of about 0.020 to .030 micron or even finer, is preferably a soft, highly absorptive, precipitated hydrated calcium silicate such as hydrated calcium silicate mineral pigment Silene EF sold by the Columbia Chemical Division, Pittsburgh Plate Glass Co.

As previously discussed, the urethane polymer is formed by two main reacting ingredients, a polyalkylene ether glycol and a polyisocyanate. The preferred polyisocyanate is 2,4-tolylene diisocyanate or a mixture of 2,4- and 2,6-tolylene diisocyanates, although other organic polyisocyanates having 2 to 3 functional isocyanato groups including organic diisocyanates may be used such as p,p'-diisocyanato diphenyl methane, p-phenylene diisocyanate, m-phenylene diisocyanate, durene diisocyanate and hexamethylene diisocyanate. In addition, particularly when the polyether is not branched enough to effectively trap $CO_2$ to form a foamed material or where a more rigid-type foam is desired, at least a part of the polyisocyanate may be a triisocyanate such as p,p',p''-triisocyanato triphenylmethane.

In the preferred method of preparing these polyetherurethane foams, an equivalent weight of polyalkylene ether glycol is first reacted with from 1.1 to 12 equivalents or more, and preferably from about 2 to 6 equivalents, of an organic polyisocyanate which preferably has 2 reactive isocyanate groups to provide a higher molecular weight polyurethane containing some free NCO groups. Some unreacted polyisocyanate may also be presented. This product hereafter will be referred to as a prepolymer.

This prepolymer is then mixed with a small amount of water, a crosslinking compound containing a plurality of active hydrogens, silicone oil, and a reaction catalyst to form a foamed material. A crosslinking agent comprising a polyfunctional material having at least 3 active hydrogen atoms may be used in order to more effectively entrap $CO_2$.

The polyalkylene ether glycols, which are preferably reacted with polyisocyanates by the prepolymer method, have the general formula $HO-(RO)_n-H$, where R represents divalent aliphatic radicals such as ethylene, propylene, butylene, isopropylene, isobutylene, tetramethylene, etc., or aromatic hydrocarbon radicals such as phenylene and the aliphatic or aromatic radicals may be the same or different. The integer represented by $n$ is such that the average molecular weight of the polyether glycol is greater than 750. In accordance with the present invention, benefits are obtained when the molecular weight preferably is at least 900 although the best physical properties in the resultant cellular polyether urethanes are obtained when the molecular weight of the polyether glycol is 1500 to 4000 or 5000, although improved products could be obtained when the molecular weight of the polyether glycol is as high as 10,000.

Excellent foams may be made by using a polyether polyols starting material which is a condensation product of an alkylene oxide of preferably 2 to 4 carbon atoms and a polyhydric alcohol of less than 7 carbon atoms and having 3 to 6 hydroxyl groups such as glycerol, pentaerythritol, hexane triol-1,2,6 and trimethylol propane. Such polyether glycols, having molecular weights of at least 750 are branched in nature and terminated with hydroxyl groups. Condensation products from mixtures of ethylene and propylene oxides are particularly useful in producing improved foamed polyurethanes for cushioning applications.

Generally, the branched polyether polyols with primary hydroxyl terminal groups are preferred. Preferred branched polyether polyols with the terminal hydroxyl groups may be formed by condensing propylene oxide and/or a mixture of propylene oxide and ethylene oxides with about 0.1 to 10 mol percent based on the alkylene oxides of a polyhydric alcohol such as glycerol, trimethylol propane and/or hexane triol-1,2,6. At the end of the condensation of the above, ethylene oxide is condensed with the resultant product to provide primary hydroxyl groups at ends of the branches. Two to four moles or so of ethylene oxide or even of propylene oxide-1,3 are usually desired for reaction with the first condensation product to provide a branched polyether with a preferred number of primary hydroxyl groups.

While it has been indicated previously that generally the polyether-urethane foams are made with a small amount of water, part or all of the water can be omitted and a halogen substituted alkane gas having a boiling point at between —60° and +80° F. such as dichloromonochloromethane can be used. Difluorodichloromethane may be used also as a blowing agent for producing polyurethane foams as described in the application Serial No. 541,823, of Charles Frost, filed October 20, 1955, now abandoned, and assigned to the same assignee of this application. When all or part of the water is replaced by a halogen substituted alkane gas, crosslinking action may be provided to enable the liquid reactants to change to a solid material and properly entrap the blowing gas by use of the above described branched polyether glycols, and/or by crosslinking agents such as trimethylol propane hereinafter discussed more fully and an organic isocyanate having more than two isocyanato groups.

The make-up and use of the activator mixture is important in order to provide useful polyurethane foams. The activator helps to coordinate the polyether forming reaction so that the liquid materials may change from the liquid to solid state quickly enough to effectively trap the blowing agent which in turn is preferably formed by the reaction of excess isocyanate and water.

The amount of water used in accordance with the present invention is dependent to some extent on the characteristics of the foam desired. We have found that the amount of water used preferably should be about 1.0% to 2.5% of the weight of the prepolymer although as little as 0.5%, and as much as 3.5% may be used in some instances. More than 5.0% of water causes excessive formation of polyurea linkages.

As representative of crosslinking compounds containing a plurality of active hydrogens, we include organic polyols such as trimethylol propane; glycerol; 1,2,4-butanetriol; hexanetriol; pentaerythritol; "Triol 230," which is the beta ethanol ether of 2-methyl-, 2-methylol-, 4-methyl-, 5-hydroxy pentane; "Quadrol," which is N,N,N',N'-tetrakis (2-hydroxypropyl) ethylene-diamine; polyamines such as triamines and tetramines including hexamethylene tetramine, etc. The above crosslinking agents contain 3 to 4 active hydrogen atoms and are used to obtain good physical properties in the resultant foamed materials.

The amounts of crosslinking agent used may be varied widely depending on the stiffness of the sponge desired. When less than 0.5 part per 100 parts by weight of organic reactants (polyether plus isocyanate) is used, the foamed material is often too soft or insufficiently cured for most purposes. Usually at least 1% to 5% or 6% of the total of polyether and isocyanate present is used, and up to 9% to 10% is sometimes used in some less flexible type foams.

As representative catalysts for the diisocyanate-polyether reaction, there are tertiary amines such as di(ethylene amino ethanol) adipate. Other suitable tertiary amines are amino alcohols such as dibutyl amino ethanol, butyl diethanol amine, ordinary alkyl tertiary amines such as triethyl amine, trihexylamine, tributyl amine, or tripropyl amine; morpholines, such as N-methyl morpholine or N-octyl morpholine; and pyridine compounds such as 4-pyridine propanol and 4-n-amyl pyridine. Organo metallic compounds such as cobalt and nickel naphthenates and linoleates, etc., are also useful catalysts. Generally alkyl tertiary amines give faster acceleration than amino alcohols or morpholines or pyridines. Mixtures of alkyl tertiary amines with either morpholines or amino alcohols or pyridine compounds are preferred to give slower acceleration. However, in some cases, especially when the amount and rate of crosslinking is adequate, the tri-alkyl tertiary amines alone produce excellent cellular products. The amount of catalyst used is generally about .5% to 2% of the weight of the prepolymer. When the amount of the catalyst is less than 0.1% and particularly when no tertiary amine is present, the reaction is generally too slow for economy, and when much more than 3 or 4% of the catalyst is used, waste of catalyst and deterioration in quality results.

The following examples illustrate the present invention.

EXAMPLE 1

Polyurethane foam materials were made with finely divided wood cellulose particles incorporated in the reaction forming ingredients before the reaction thereof. The amounts of polyurethane-forming materials and wood cellulose are found in the following formula:

*Table I*

100 grams prepolymer
3 grams TDI (2,4-tolylene diisocyanates)
0.35 gram dimethyl siloxane polymer, viscosity of 100 centistokes at 100° F.
1.25 grams triethylamine
1.50 grams N-methyl morpholine
1.90 grams water
20 grams finely divided wood cellulose The prepolymer material was prepared by mixing and reacting 180 grams of a 65/35 mixture of 2,4- and 2,6-tolylene diisocyanates with 600 grams of poly(ethylene-propylene) ether glycol having a molecular weight of 2000. The wood cellulose was mixed into the prepolymer and the wood cellulose/prepolymer mix was added to an activator mixture containing silicone oil, triethylamine and N-methyl morpholine. The activator mixture and prepolymer were mixed by air stirrers in one-half gallon containers. The resultant foamed products were formed by the liberation of carbon dioxide from reaction of the water and the isocyanato groups of the diisocyanate. The samples were cured for one hour at 115 to 120° C. and then kept at room temperature for 16 hours. The samples thereafter were cured again for 8 hours at 115 to 120° C. Thereafter, the cured foamed material was tested, along with a control sample made according to the recipe of Table I except that no wood cellulose was used. The results of the tests are listed in Table II.

Table II

|  | Foam, containing 20 parts wood cellulose | Control Foam, no wood cellulose |
|---|---|---|
| Density lb./ft.$^3$ | 2.65 | 2.35 |
| Tensile lb./in.$^2$ | 12.8 | 18.0 |
| Elongation, percent | 240 | 320 |
| Tear, lb./in | 2.00 | 3.5 |
| Resilience (Schopper) | 47 | 50 |
| 50% Deflection Compression Set, percent | 14.3 | 8.5 |
| 90% Deflection Compression Set, percent | 12.7 | 10.9 |
| Indent-load 25% Deflection (lbs./50 sq. in.) | 21.0 | 17.5 |
| Indent-load 50% Deflection (lbs./50 sq. in.) | 40.0 | 27.0 |
| Indent-load 75% Deflection (lbs./50 sq. in.) | 135.0 | 63.0 |
| Flexing losses, 80% Flex, 250,000 flexes: |  |  |
| 10% Deflection Loss | 30.7 | 40.5 |
| 25% Deflection Loss | 17.1 | 36.9 |
| 50% Deflection Loss | 8.6 | 26.2 |
| 75% Deflection Loss | 0.0 | 0.0 |
| Humidity Aging Changes (Percent Change in load deflection): |  |  |
| 3 Hours Steroclave | +12.6 | −13.4 |
| 6 Hours Steroclave | −3.0 | −22.5 |
| 9 Hours Steroclave | −4.0 | −30.0 |
| Humidity Aging Changes: |  |  |
| 7 days @ 195° F., 100% Humidity—Beaker Method | −21.9 | −43.2 |
| 7 days @ 175° F., 100% Humidity—Humidity oven | −11.4 | −26.7 |

As seen in Table II, 17.5 pounds were required to indent 50 square inches of the control foam material 25 percent. In comparison, 21 pounds were required to indent the polyether urethane foam made with 20 parts by weight wood cellulose 25 percent. At higher deflections, namely 50 and 75 percent deflection, pronounced stiffening of the wood cellulose foam is evident. At 75% deflection, 135 pounds were required to indent 50 square inches of the improved polyether urethane foam as compared to only 63 pounds for the standard polyether-urethane foam.

The wood cellulose prepared polyurethane foam, when used as a cushioning material, had a soft initial feel but yet did not "bottom out" at high load, which desirable properties are indicated by the above test data.

As also indicated in Table II, the humidity aging resistance property of the improved polyurethane foam is much improved over that of the control foam in the particular foams tested.

The Steroclave test is conducted by using a pressure-type cooker which has an atmosphere of 100% relative humidity and a pressure over that of atmospheric. The temperature inside the Stereoclave is generally about 220 to 230° F. and the foam samples are kept inside the cooker generally for 3 hour intervals.

In the beaker method of testing humidity aging properties, the foam sample is supported by a wire table or platform over the water level of a 1000 ml. or 2000 ml. beaker. The top of the beaker is generally sealed to prevent circulation of the air over the sample. A film of polyethylene is generally used to cover the top of the beaker and the film taped to hold it on during the duration of the test which may be 7 or more days.

In the humidity oven testing procedure, an atmosphere of 100% relative humidity is maintained inside the oven at a temperature of generally 175° F. Unlike the closed beaker method, there is circulation of air over the foam samples in the humidity oven.

It can be seen in Table II, that the flex resistance of the polyether-urethane foam prepared with wood cellulose is outstanding. The loss in load exhibited by the wood cellulose/polyurethane foam sample was low, approximately only half the loss exhibited by the control foam sample.

EXAMPLE 2

A control foam sample and a polyalkylene-ether glycol urethane foam sample having 20 parts by weight of wood cellulose were prepared as described in Example I. Also, another polyether urethane foam sample was prepared according to the recipe shown in Table I except that 15 parts by weight per 100 parts by weight of prepolymer of wood cellulose were used. The three foam samples were cured as described in Example I and tested with a high density rubber latex foam (density about 6.15 lbs./ft.$^3$) and a cored latex foam, the results of which are summarized below:

Table III

| Foam | No. Flexes | Percent Compression | Loss in Load on Flexing | | |
|---|---|---|---|---|---|
|  |  |  | 10% | 25% | 75% |
| Control Foam (Polyether urethane) | 250,000 | 80 | 40.5 | 30.9 | 0 |
| High Density Latex | 250,000 | 80 | 17.0 | 24.2 | 12.5 |
| Cored Latex | 250,000 | 80 | 19.3 | 30.9 | 15.7 |
| 20 Parts wood cellulose | 250,000 | 80 | 30.7 | 17.1 | 0 |
| 15 Parts wood cellulose | 250,000 | 80 | 28.9 | 19.5 | 0 |

The data shown in Table III indicates that the flex resistance of the wood cellulose prepared foams is greatly improved over standard polyether urethane foams and, further, that the flex resistance is at least equal to the best slab foams—even those made of natural rubber latex.

EXAMPLE 3

Polyether-urethane sponge materials were made according to the following recipe:

Table IV

|  | A | B | C (Control) |
|---|---|---|---|
|  | Parts by Weight | | |
| Prepolymer | 100 | 100 | 100 |
| Silicone oil (dimethyl siloxane polymer having a viscosity of 10 centistokes at 100° F.) | 0.2 | 0.2 | 0.2 |
| Activator Mixture (1.25 parts triethylamine, 1.50 parts N-methyl morpholine, 1.90 parts water) | 4.65 | 4.65 | 4.65 |
| Talc (400 mesh) | 10 | 20 | 0 |

The prepolymer material was the viscous liquid reaction product of poly (ethylene-propylene) ether glycol and a mixture of 2,4- and 2,6-tolylene diisocyanates as described in Example I. The silicone oil and talc were dispersed in the prepolymer. The talc-loaded prepolymer was reacted with the activator in a commercial foam machine to produce cellular polyether-urethane elastomers. The results of tests conducted on the above cellular polyurethanes are shown in Table V:

Table V

| Properties | A | B | C |
|---|---|---|---|
| Density, lbs./ft.$^3$ | 2.56 | 2.70 | 2.35 |
| Tensile, p.s.i | 16.0 | 17.50 | 18.0 |
| Elongation, percent | 215 | 220 | 320 |
| Tear, lb./in | 1.95 | 2.0 | 3.5 |
| 90% Deflection | | | 10.9 |
| Compression Set, percent, 3 days | 8.1 | 6.8 | 12 |
| 25% Load Deflection, lbs | 31.5 | 33.0 | 30 |
| 50% Load Deflection, lbs | 45.0 | 46.5 | 38 |
| Schopper Resilience | 42 | 47 | 50 |
| Lupke Resilience | 52 | 53 | |
| Humidity Aging Loss (Percent change in load deflection) 7 days @ 195° F | 26.7 | 28.3 | 43.2 |
| Flex Loss (25% compression) 250,000 cycles, 80% Deflection | 24.4 | 27.9 | 30.9 |

As seen in Table V, the talc-modified polyether-urethane foams showed excellent set characteristics. They also exhibited substantially increased load values over the control foam, particularly at 50% deflection.

Generally the polyether-urethane foams made with talc are well suited for applications where deflection service is relatively high, say 50%; and high load carrying ability at this deflection is more important than other properties such as a soft initial feel, humidity aging, and flex resistance, although these properties were also improved to some degree in the talc-made polyether urethane foams.

Polyether-urethane foams including control samples containing no mineral additives were made according to the procedure described in Example 3.

The results of tests conducted on the foams together with the amount of mineral filler used are found in Table VII.

Table VII

| Sample | Filler | Parts | 90% Compression Set | | Change in Load Deflection after humidity aging 2 weeks | Tensile Strength, p.s.i. | Tear Strength, lb./in. | Elongation, percent |
|---|---|---|---|---|---|---|---|---|
| | | | Percent | Days | | | | |
| A | Mica | 3 | 70.6 | 7 | −25.8 | | | |
| B | do | 5 | 25.9 | 7 | | | | |
| C | do | 10 | 6.5 | 7 | −32.3 | | | |
| D | Talc | 3 | 12.2 | 7 | | 14.0 | 3.1 | 290 |
| E | do | 5 | 52.1 | 7 | | 15.3 | 3.7 | 240 |
| F | do | 10 | 3.4 | 7 | | 12.8 | 3.5 | 170 |
| G | Calcium carbonate | 3 | 52.6 | 7 | | 17.8 | 4.0 | 240 |
| H | do | 5 | 12.9 | 7 | | 16.8 | 3.9 | 250 |
| I | do | 10 | 11.9 | 7 | | 18.3 | 4.0 | 180 |
| J | Silene EF | 3 | 48.6 | 7 | | | | |
| K | do | 5 | 55.3 | 7 | | | | |
| L | do | 10 | 8.9 | 7 | −10.9 | | | |
| M | Control | | 79.0 | 7 | | 22.4 | 4.7 | 420 |
| N | do | | 79.4 | 7 | −17.4 | 18.1 | 2.3 | 260 |

EXAMPLE 4

A series of polyurethane foams were prepared according to the following recipe:

Table VI

Parts by weight
Prepolymer (600 parts by weight of poly(propylene) ether glycol having a molecular weight of 2000 and 180 parts of a 65/35 mixture 2,4- and 2,6-tolylene diisocyanates) _____ 100
Activator mixture (1.25 parts triethylamine, 1.50 parts N-methyl morpholine, and 1.90 parts water) 4.65
Silicone oil (dimethyl siloxane polymer having viscosity of 100 centistokes at 100° F.) _____ 1.0
Talc or other mineral material, as noted in Table VII.

In the above table sample "N" had a flex loss of −28.4 (250,000 cycles to 85% compression) also the Lupke and Schopper resiliency of sample "N" was 55 and 44 respectively. Also in the above table, Silene EF is hydrated calcium silicate. In Table VII, the tensile strength, tear strength and elongation were measured after humidity aging for 2 weeks.

EXAMPLE 5

Another series of polyurethane foams, including control foams, were prepared according to recipe of Table VI and using the procedure described in Example 4. Results of tests along with the amount of mineral filler used may be seen in Table VIII.

Table VIII

| Sample | Filler | Parts by Weight | 90% Compression Set, 14 days | Percent Change in Load Deflection After Humidity Aging (at 175° F.) | Flex Loss 250,000 Cycles to 85% Compression | p.s.i. Tensile | lb./in. Tear | Elongation | Resiliency | |
|---|---|---|---|---|---|---|---|---|---|---|
| | | | | | | | | | Lupke | Schopper |
| O | Talc | 13.7 | Percent 15.3 (10 days) | | Percent | 22 | 3.8 | Percent 400 | 48 | 34 |
| Q | do | 15 | 78.5 | | | | | | | |
| R | do | 15 | 18.0 | | | | | | | |
| S | do | 15 | 6.6 | | | | | | | |
| T | do | 20 | 12.1 | −28.3% (1 week) | −27.9 | 17.5 | 2.0 | 220 | 53 | 47 |
| U | do | 21 | 25.7 | | | | | | | |
| V | do | 21 | 62.3 | | | | | | | |
| W | do | 25 | 11.4 | | | | | | | |
| X | do | 25 | 80.5 | | | | | | | |
| Y | do | 15 | 17.0 | | | | | | | |
| Z | do | 10 | 9.8 | −27.9% (1 week) | −24.4 | 16.0 | 2.0 | 215 | 52 | 42 |
| A′ | Talc (10.6% NCO) | 16 | 9.2 | | | | | | | |
| B′ | do | 16 | 8.0 | | | | | | | |
| C′ | Control | | 81.8 | | | | | | | |

The foams prepared in Examples 4 and 5 were tested to find the amount of load required to indent 50 square inches of the foam 50%. The results are found below:

*Table IX*

| Sample | Loading | | Density, lbs./cu. ft. | Indent-Load 50% (60 Sec. Drift) |
|---|---|---|---|---|
| | Filler | Parts by Weight | | |
| *Runs from Example 4* | | | | |
| A | Mica | 3 | 2.54 | 36.5 |
| B | ...do... | 5 | 2.60 | 43.8 |
| C | ...do... | 10 | 3.55 | 66.5 |
| D | Talc | 3 | 2.64 | 37.2 |
| E | ...do... | 5 | 2.38 | 33.5 |
| F | ...do... | 10 | 2.75 | 40.2 |
| G | Calcium carbonate | 3 | 2.48 | 33.3 |
| H | ...do... | 5 | 2.40 | 32.3 |
| I | ...do... | 10 | 3.22 | 50.8 |
| J | Hydrated calcium silicate | 3 | 2.42 | 31.5 |
| K | ...do... | 5 | 2.46 | 32.0 |
| L | ...do... | 10 | 3.00 | 42.2 |
| M | Control run (Example 5) | | 2.59 | 30.0 |
| N | ...do... | | 2.43 | 28.9 |
| *Runs from Example 5* | | | | |
| O | Talc | 13.7 | 2.42 | 37.5 |
| P | ...do... | 13.7 | 2.30 | 34.0 |
| Q | ...do... | 15 | 2.55 | 35.3 |
| R | ...do... | 15 | 2.73 | 40.6 |
| S | ...do... | 15 | 2.65 | 38.5 |
| T | ...do... | 20 | 3.19 | 48.1 |
| U | ...do... | 21 | 2.79 | 40.7 |
| V | ...do... | 21 | 2.50 | 34.5 |
| W | ...do... | 25 | 3.28 | 40.9 |
| X | ...do... | 25 | 2.92 | 36.2 |
| Y | ...do... | 15 | 2.75 | 37.4 |
| Z | ...do... | 10 | 2.67 | 41.0 |
| A' | ...do... | 16 | 2.64 | 43.0 |
| B' | ...do... | 16 | 2.98 | 48.9 |
| C' | Control run (Example 4) | 16 | 2.40 | 27.5 |

It can be seen from Examples 4 and 5 and from Tables VII, VIII and IX that the load carrying capacity of talc and other mineral bearing foams was significantly increased at high deflection while the load capacity at low deflection was relatively little increased.

In particular, the foam material marked O in Tables VIII and IX was found to be an excellent cushioning material for the third seats in station wagons, where a relatively high load value at 50% compression is important. In addition, the tear strength of this same foam, marked sample O, is slightly higher than the control sample, marked sample C' in Table VIII. The other physical properties of sample O containing 13.7 parts talc were not significantly different than control sample C', although the resilience was slightly lower.

In samples A' and B' (16 parts talc) of Table VIII, higher compression values at the same density were obtained by adding 2 to 3 parts of a 65/35 mixture of 2,4- and 2,6-tolylene diisocyanates to the talc and prepolymer material mixture prior to the foaming step.

The dimethyl siloxane polymer used in the above examples may be substituted in whole or part by other dialkyl, diaryl, or mixed alkyl-aryl siloxane polymers such as polydiethyl siloxane, polymethyl-ethyl siloxane, polydiphenyl siloxane and polymethyl phenylsiloxane having viscosities ranging from about 10 to 200 centistokes at 100° F. When polyalkylene ether glycols are used as the starting polyol materials, a larger amount of silicone oil is required, which is on the order of .25 to 2% by weight of the polyether plus polyisocyanate as described in the copending application of George T. Gmitter, Serial No. 707,351, filed January 6, 1958.

It is to be understood that in accordance with the provisions of the patent statutes, the particular form of product shown and described and the particular procedure set forth are presented for purposes of explanation and illustration and that various modifications of said product and procedure can be made without departing from our invention.

Having thus described our invention, what we claim is:

1. In a process for producing a foamed polyurethane material in which polyurethane forming reactants comprising (1) a hydroxyl terminated polyalkylene ether polyol having a molecular weight of at least 750 and having an acyclic molecular chain containing only carbon to carbon links and carbon to oxygen links; (2) an organic polyisocyanate having two to three functional isocyanato groups; and (3) an activator mixture comprising water and a reaction catalyst which influences the polyurethane reaction, are reacted in the equivalent weight ratio of polyisocyanate to polyalkylene ether polyol of about 1.1/1 to 12/1 to form a polyurethane foamed material, the improvement which comprises bringing together and reacting said reactants with about 2 to 60 parts by weight based on 100 parts by weight of said polyalkylene ether polyol plus polyisocyanate of finely divided particles of wood cellulose.

2. In a method of making a relatively light density foamed polyurethane in which polyurethane forming reactants comprising (1) a hydroxyl terminated polyalkylene ether glycol having a molecular weight of at least 750 and having an acylic generally long linear chain with at least 50% by weight of its chain linkages formed by aliphatic carbon to carbon bonds; and (2) an organic polyisocyanate having two to three functional isocyanato groups are reacted together to form a polyetherurethane said polyisocyanate being used in an excess amount over a 1 to 1 equivalent weight ratio with the polyether glycol, the improvement which comprises mixing finely divided wood cellulose particles with the polyisocyanate and polyalkylene ether glycol, reacting said glycol and polyisocyanate to form a liquid prepolymer with a polyurethane reaction catalyst, and thereafter reacting said prepolymer with enough water so that the total amount of water used is about .5 to 5% by weight of the weight of said prepolymer to thereby form a polyurethane foamed material, said wood cellulose being used in an amount of from about 5 to 50 parts by weight per 100 parts by weight of said glycol and said polyisocyanate.

3. In a process of preparing a cellular polyurethane elastomer, the steps of (1) mixing a hydroxy terminated acylic polyalkylene ether glycol having a molecular weight of about 750 to 10,000 with an excess amount of an organic polyisocyanate having 2 to 3 isocyanato groups over that required to react with the hydroxyl end groups of said polyalkylene ether glycol to form a substantially moisture-free liquid prepolymer containing some free isocyanato groups, and (2) thereafter reacting the prepolymer with an activator mixture comprising a polyurethane reaction catalyst, water and from 10 to 25 parts by weight based on 100 parts by weight of said prepolymer of finely divided particles of wood cellulose having an average particle size of from about 1 to 100 microns.

4. A product produced according to the process as defined in claim 1.

References Cited in the file of this patent
UNITED STATES PATENTS

| | | |
|---|---|---|
| 2,842,506 | Roussel | July 8, 1958 |
| 2,843,568 | Benning et al. | July 15, 1958 |
| 2,871,227 | Walter | Jan. 27, 1959 |

UNITED STATES PATENT OFFICE
CERTIFICATE OF CORRECTION

Patent No. 3,021,290            February 13, 1962

George T. Gmitter et al.

It is hereby certified that error appears in the above numbered patent requiring correction and that the said Letters Patent should read as corrected below.

Column 12, line 29, for "acylic" read -- acyclic --; lines 39 and 40, strike out "with a polyurethane reaction catalyst"; line 41, after "prepolymer" insert -- with a polyurethane reaction catalyst and --; line 49, for "acylic" read -- acyclic --.

Signed and sealed this 3rd day of July 1962.

(SEAL)
Attest:

ERNEST W. SWIDER
Attesting Officer

DAVID L. LADD
Commissioner of Patents